Feb. 3, 1925. 1,525,395
G. JUER
MIXING AND AGITATING APPARATUS
Filed July 1, 1920   2 Sheets-Sheet 1

Inventor:
George Juer
By
Rosenbaum, Stockridge & Borst
Attys

Feb. 3, 1925.

G. JUER 1,525,395

MIXING AND AGITATING APPARATUS

Filed July 1, 1920   2 Sheets-Sheet 2

Inventor:
George Juer
By
Rosenbaum, Stockbridge & Boss
Attys

Patented Feb. 3, 1925.

1,525,395

UNITED STATES PATENT OFFICE.

GEORGE JUER, OF PHILADELPHIA, PENNSYLVANIA, ASSIGNOR TO TUBIZE ARTIFICIAL SILK COMPANY OF AMERICA, OF WILMINGTON, DELAWARE, A CORPORATION OF DELAWARE.

MIXING AND AGITATING APPARATUS.

Application filed July 1, 1920. Serial No. 393,403.

*To all whom it may concern:*

Be it known that I, GEORGE JUER, a citizen of Hungary, residing at Philadelphia, in the county of Philadelphia and State of Pennsylvania, have invented certain new and useful Improvements in Mixing and Agitating Apparatus, of which the following is a full, clear, and exact description.

The object of the invention is to provide an arrangement by means of which, without the direct aid of human labor, a substance can be dipped and simultaneously vigorously agitated within a liquid in order to dissolve or impregnate it with the liquid, and by which the dissolving or impregnating can be accomplished more rapidly and intensively than heretofore, with a saving of labor and liquid, and without danger of injury to the attendants and workmen when using substances that are detrimental to health.

The invention comprises a spindle mounted for rotary and longitudinal movement and carrying a dipping disc for dipping and agitating the contents of the container. Suitable means is provided for automatically and repeatedly causing the spindle and disc to move downwardly into the container while rotating in one direction and then to move outwardly while rotating in the opposite direction. A scraper for cleaning the dipping and agitating disc may be supported for engagement with the disc at its upper limit of movement.

Figure 1:
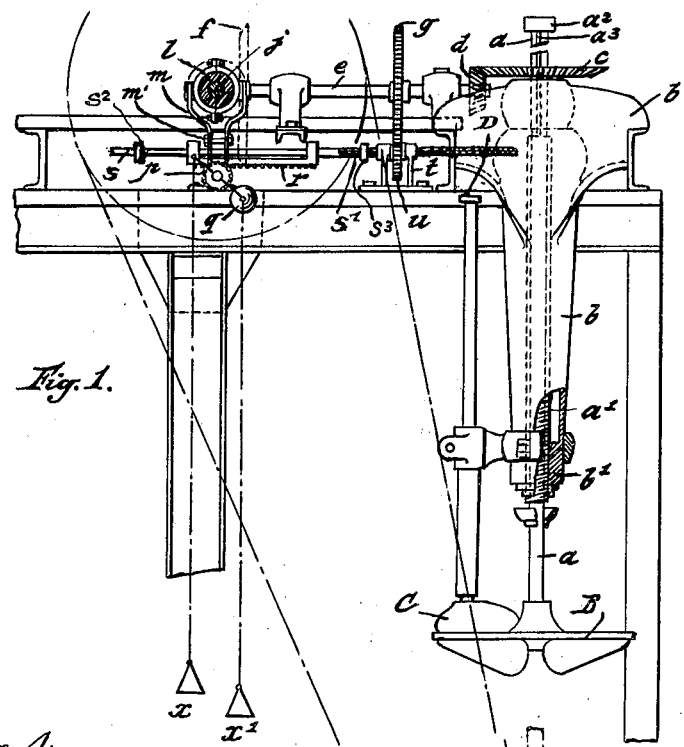
Fig. 1 is a front elevation partly in section of a device constructed in accordance with my invention.
Figure 4:
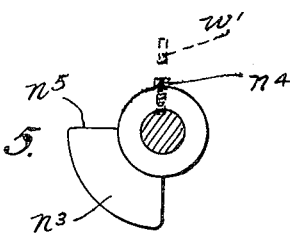
Figure 5:
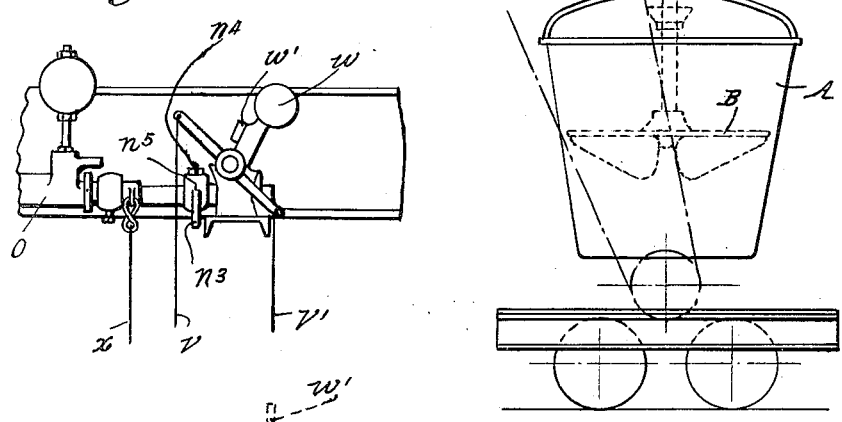
Figure 2:
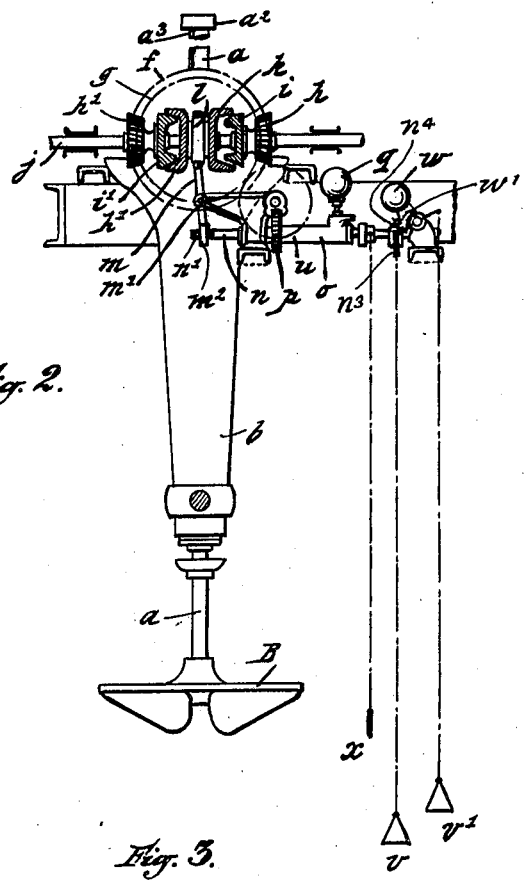
Fig. 2 is a side elevation of the same, also partly in section.
Figure 3:
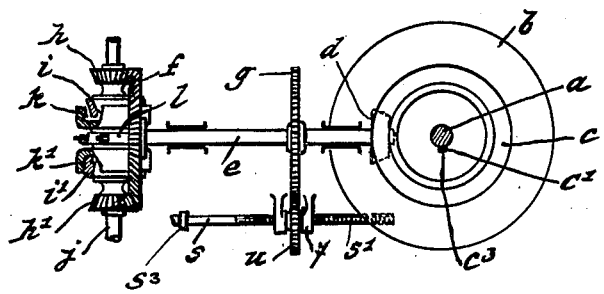

Fig. 3 in a plan of certain of the details;

Fig. 4 is a view of a portion of the apparatus shown in Figure 2 and illustrating the parts in a different operative position; and Fig. 5 is a section of the same showing the construction of the stopping arm or disc.

The acid mix is disposed within a tiltable nitrating pot A which is adapted to be moved beneath the agitating device. The agitating disc B, which comprises a perforated plate, is carried upon the lower end of a vertically disposed spindle $a$ that is supported in threaded engagement with the section $b'$ of a hollow guide or casing $b$ through which the spindle $a$ passes. A rotary movement imparted to the spindle $a$ will cause also an endwise movement of the latter because of its threaded engagement with its support. Near its upper limit of endwise movement the spindle may engage with a suitable scraper C carried upon the end of a rod D that is adjustably supported in turn from the casing $b$. Excessive downward movement of the spindle $a$ is prevented by a collar or head $a^2$ provided upon its upper end.

A bevel gear or disc $c$ is keyed to and slidably mounted upon the upper portion of the spindle $a$, above the casing $b$, by a key $a^3$ on the spindle which engages with a groove in the hub of the gear or disc $c$. The gear or disc is held by gravity against the upper end of the casing and will rotate the spindle while permitting of its endwise movement. A bevel gear or disc $d$ is fixed to the shaft $e$ and meshes with and drives the gear or disc $c$. The shaft $j$ which acts as the driving element, being rotated by a suitable source of power (not shown), carries loosely and non-slidably thereon a pair of spaced units, the adjacent ends of the units being clutch elements $i$ and $i'$ and the opposite ends bevel gears or discs $h$ and $h'$. The gears $h$ and $h'$ mesh at all times with the diametrically opposite sides of a bevel gear or disc $f$ fixed upon the shaft $e$. A double clutch element is keyed to and slidable upon the shaft $j$ between the clutch elements $i$ and $i'$. As the double clutch element is shifted in one direction or the other along the shaft $j$ it will engage with and rotate either the clutch element $i$ or the element $i'$ and through them rotate the gear $g$ and shaft $e$ in one direction or the other dependent upon the position of the double clutch element.

A removable ring $l$ is rotatably and non-slidably carried by the double clutch element, and is pivotally connected to the fork upon one end of a lever $m$ pivoted at $m'$ so that movement of the lever about its pivot will shift the double clutch element into either of its two operative clutching positions. The free end of the lever $m$ carries a screw nut $m^2$ through which passes the threaded end $n'$ of a shaft $n$ keyed for sliding movement within a hollow shaft $o$. The shaft $o$ is provided with an eccentric weight $q$ and a gear $p$, the latter being fixed thereon and meshing with a rack $r$ slidably and rotatably carried by the shaft $s$. The rack is held against turning by a guide $r^3$ (Fig. 2) in which it slides. The shaft $s$ at one end $s'$ is threaded through a pair of slightly spaced bearings $t$ and between these bearings the shaft carries a pinion $u$ which has within its bore a key that projects into a key way running endwise of the shaft so that rotation of the pinion will cause a rotation of the shaft $s$ while leaving it free to move endwise by the reaction between its threads and those of the bearings. The pinion $u$ meshes with a gear $g$ fixed upon the shaft $e$ so that the shaft $s$ will be rotated and moved endwise in opposite directions with a reverse in the direction of rotation of the shaft $e$. The shaft $s$ carries, at spaced points thereon, two fixed collars $s^2$ and $s^3$ which engage and operate the rack with the shaft in an endwise direction near the limit of the movement of the shaft in each direction, the rack shifting the weight $q$ past a vertical position of its radius of rotation with the result that gravity then moves the weight $q$ further, rotates shaft $n$ and through pinion $p$ slides the rack along the shaft $s$. The shaft $n$ is provided with radial arms from the ends of which are hung chains $x$ and $x'$ so that the shaft can be oscillated manually to shift the double clutch element. A weighted pivoted arm $w$ may be operated to either side of a vertical position by chains $v$ and $v'$. When operated to the position illustrated in Fig. 2, a lug $w'$ thereon is moved against the periphery of a disk $n^3$ fixed to the shaft $n$ by a screw $n^4$ and rides thereon so that when the weight $q$ passes over the shaft $n$ in one of its direction changing movements, the lug $w'$, actuated by the weight $w$ will drop into a notch $n^5$ in the periphery of the disc $n^3$, and by the engagement of one of the end walls of the notch with the lug, which engagement is caused by the continued rotation of the shaft $n$ under the force of the falling weight $q$, the movement of the disc $n^3$ and through it the rotary movement of the shaft $n$ and weight $q$ will be limited short of that necessary to complete an operation of the clutch $k$ $k'$. This particular direction changing movement is that which occurs when the agitator disc B is approaching its upper limit of movement and in this manner the clutch is held in an intermediate position and out of driving relation with both elements $i$ and $i'$ and the agitator disc will not be driven. The notch $n^5$ is sufficiently long that the opposite end wall will not engage the lug $w'$ at the limit of movement of the weight $q$ upon the other side of the shaft $n$ in order that the stopping will occur only when the agitator is at its upper limit of movement. If the weight $w$ is operated into its stopping position while the notch is in the path of the lug $w'$, the latter will drop directly into the notch without first riding upon the periphery of the disc. The weight $w$ may therefore be operated at any time and the agitator will be stopped at the next upward movement of the agitator. The movement of the weight $w$ in each direction is limited by suitable lugs (not shown) provided upon its mounting within the path of the arm of the weight.

In operation the weighted arm $w$ can be operated by the chains $v$ or $v'$ to release the weight $q$ and permit it to fall and in doing so shift the double clutch element so as to cause a driving of the spindle $a$ and agitating disc in the required direction. The rotation of the spindle causes it to move endwise down into the receptacle A and the disc B will engage the contents and thoroughly dip and agitate the same. During this rotation of the spindle $a$, the gear $g$ on the shaft $e$ will drive the pinion $u$ which causes an endwise movement of the shaft. When a collar on the shaft engages and operates the rack, the latter in turn drives the pinion $p$ upon the shaft $o$ and through it the shaft $n$ that is keyed to shaft $o$. Rotation of the shaft $n$ causes the nut $m^2$ to move along the same and when the weight passes its highest point and falls it shifts the double clutch element into its opposite position and into engagement with the other clutch element, thereby reversing the direction of rotation of the spindle. The neutral point in this movement of the double clutch element where the clutch elements $k$ and $i$ are disengaged and the elements $k'$ and $i^1$ not yet engaged is passed over by the action of the weight $q$. The reverse action now takes place and the opposite movement causes a similar reversal at the other limit of movement. The parts are proportioned so as to cause the reverse in the direction of rotation of spindle $a$ to occur at the moments that the disc B has completed the desired upward or downward movement. If it is desired for any reason to cause a reversal of rotation of the spindle $a$ before the device would automatically perform that act, it is merely necessary to operate the chains $x$ and $x'$, so as to shift the weight $a$, the shaft $o$ and the shaft $n$ through the necessary unfinished distance. It will be seen that with this device there will be no entangling of the contents of the receptacle A with the disc, since any winding of cotton or other substance around the disc while the latter is rotating in one direction will be followed by an equal rotary movement of the disc in the opposite direction, which would unwind the same again.

After the desired number of upward and downward movements of the disc B the device can be stopped by shifting the weight w to Fig. 2 position, and a new receptacle with contents to be agitated disposed beneath the disc B. The disc B is cleaned at each upward movement by engagement with the scraper C.

I claim:

1. An agitating device comprising a spindle, means for supporting the spindle for combined rotary and longitudinal movement, a dipping and agitating disc carried by the spindle, means for rotating the spindle to cause an endwise movement dependent upon the direction of rotation, and means for automatically reversing the direction of rotation of the spindle at the end of a given endwise movement to cause the disc to rotate in one direction while entering a receptacle and in the opposite direction while leaving the receptacle.

2. An agitating device comprising a spindle, a support in which the spindle is threaded, an agitating disc carried by the spindle so as to be moved into or out of the material being mixed, depending upon the direction of rotation of the spindle, a driving element for rotating the spindle, and means interposed between the element and spindle for alternately reversing the direction of rotation of the spindle by the element whereby the disc rotates in one direction to effect a partial mixing of the material and then in the opposite direction to further mix the material and become disengaged therefrom.

3. An agitating device comprising a spindle, a support in which the spindle is threaded, an agitating disc carried by the lower end of the spindle, a gear keyed to the shaft and slidable thereon, a driving element, means including rotation reversing mechanism for connecting the driving element to the gear whereby the spindle will be rotated in one direction or the other dependent upon the condition of the reversing mechanism, and automatic means for operating the reversing mechanism to change the direction of rotation of the spindle and limit the endwise movement of the latter in one direction.

4. An agitating device comprising a spindle, a support in which the spindle is threaded, an agitating disc carried by the lower end of the spindle, a gear keyed to the shaft and slidable thereon, a driving element, means including rotation reversing mechanism for connecting the driving element to the gear whereby the spindle will be rotated in one direction or the other dependent upon the condition of the reversing mechanism, and automatic means driven by the first named means for operating the reversing mechanism to change the direction of rotation of the spindle and thereby limit the endwise movement of the latter in one direction.

5. An agitating device comprising a spindle, a support in which the spindle is threaded, an agitating disc carried by the spindle, a driving element, means connecting the element and spindle for rotating the latter in opposite directions, in its support, and means operated by the connecting means for causing a change in the direction of rotation of the spindle and thereby limiting its endwise movement in one direction.

6. An agitating device comprising a spindle, a support in which the spindle is threaded, an agitating disc carried by the lower end of the spindle, a gear keyed to the shaft and slidable thereon, a driving element, means including rotation reversing mechanism for connecting the driving element to the gear whereby the spindle will be rotated in one direction or the other dependent upon the condition of the reversing mechanism, a rod, a support through which the rod is threaded a gear keyed to and slidable upon the rod, a driving connection between the last named gear and the connecting means, and means operated by the endwise movement of the rod for changing the condition of the reversing mechanism to reverse the direction of rotation of the spindle.

7. An agitating device comprising an agitating element, driving means, a connection between said means and element for driving said element in opposite directions and having a controlling member operative when in one position to cause the drive to be in one direction and when in another position to cause the drive to be in the opposite direction, a shaft having threaded engagement with said member whereby rotation of the shaft will cause a movement of the member to one or the other of said positions dependent upon the direction of rotation of the shaft, a weighted arm connected to said shaft to rotate it in one direction or the other dependent upon which side of the vertical it is on, and means connected to said connection and operable thereby to shift the arm past the vertical and effect a change in the direction of movement of the element after a given movement in each direction.

8. An agitating device comprising an agitating element, mechanism for driving the element in either direction, a member for controlling the direction of movement of the element, a shaft having a threaded portion, a bearing in which the threaded portion of the shaft is in threaded engagement, means for rotating said shaft in accordance with the movement of the element, collars spaced on said shaft, a rack slidable on said shaft and engaged by said collars, a second shaft having a pinion meshing with the rack, a weighted arm secured to said second shaft, a connection between the second shaft and the controlling member whereby upon movement of the arm through the vertical position of its radius of movement in either direction it will move further under the action of gravity and rotate the shaft sufficiently to operate the controlling member and cause a change in the direction of movement of the element, said rack being engaged by the collars to be shifted thereby and move the arm beyond the vertical position of its radius of movement after determined movements of the element in each direction.

9. An agitating device comprising an agitating element, mechanism for driving the element in either direction, a member for controlling the direction of movement of the element and for rendering the mechanism ineffective to drive the element, a shaft having a threaded portion, a bearing in which the threaded portion of the shaft is in threaded engagement, means for rotating said shaft in accordance with the movement of the element, collars spaced on said shaft, a rack slidable on said shaft and engaged by said collars, a second shaft having a pinion meshing with the rack, a weighted arm secured to said second shaft, a connection between the second shaft and the controlling member whereby upon movement of the arm through the vertical position of its radius of movement in either direction it will move further under the action of gravity and rotate the shaft sufficiently to operate the controlling member and cause a change in the direction of movement of the element, said rack being engaged by the collars to be shifted thereby and move the arm beyond the vertical position of its radius of movement after determined movements of the element in each direction, and means operable to and from a position in which it is engaged by the second shaft while the second shaft is being shifted to reverse the movement of the element for holding the second shaft at a position intermediate of its extreme rotary positions and thereby holding the controlling member in a position to render the driving mechanism ineffective to drive the element.

In witness whereof, I hereunto subscribe my signature.

GEORGE JUER.